March 30, 1965  N. B. LERNER  3,175,733
MEANS FOR HEATING THE CONTENTS OF A PRESSURIZED AEROSOL-TYPE
DISPENSER AS SAME IS BEING DISCHARGED FOR USE
Filed June 27, 1962 2 Sheets-Sheet 1
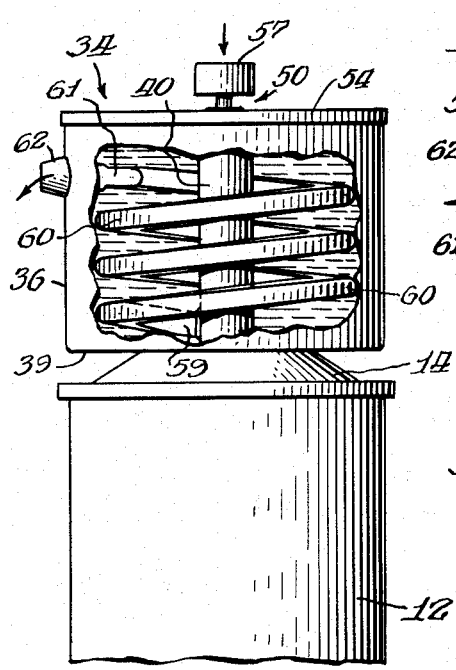
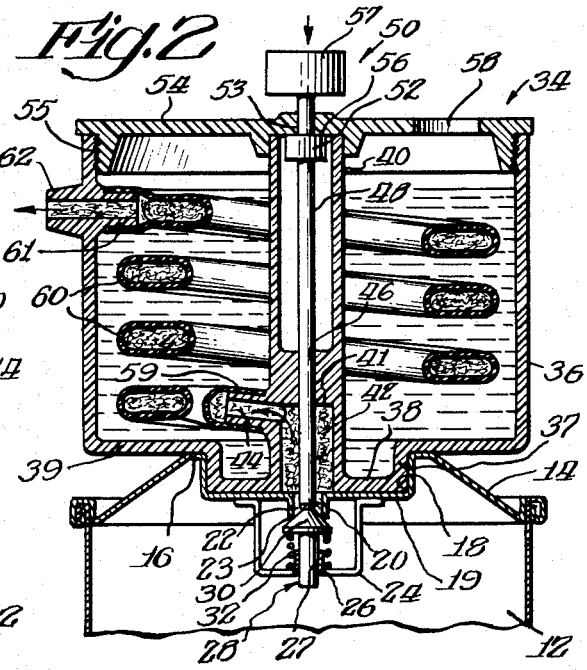
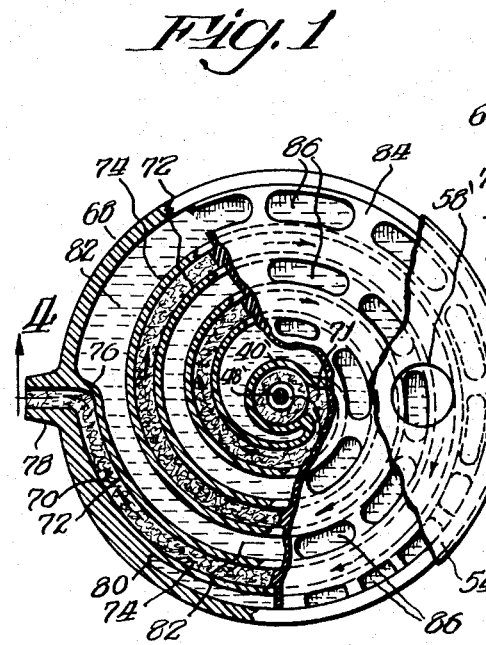
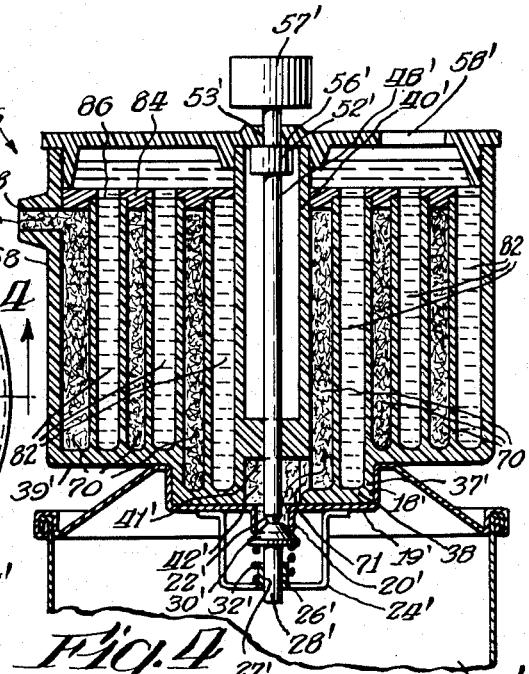
Inventor:
Nathan B. Lerner
BY May R. Kraus ATTY.

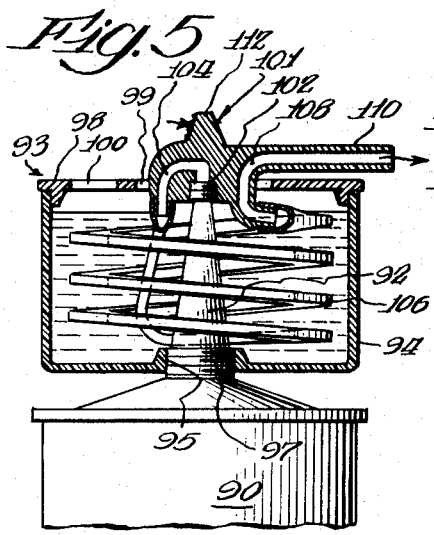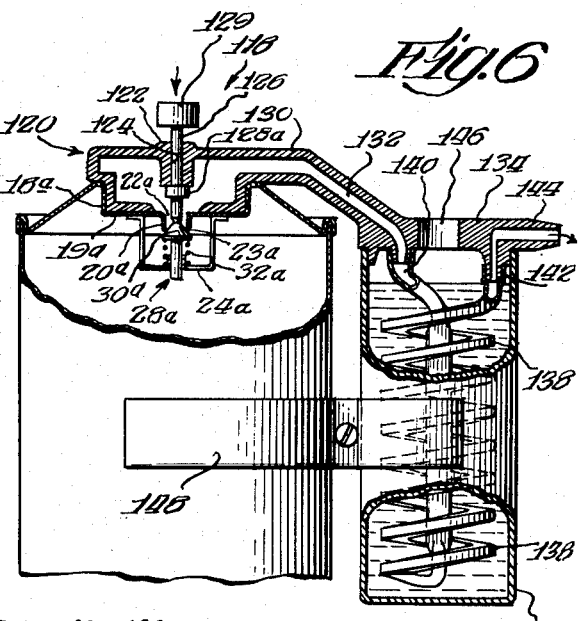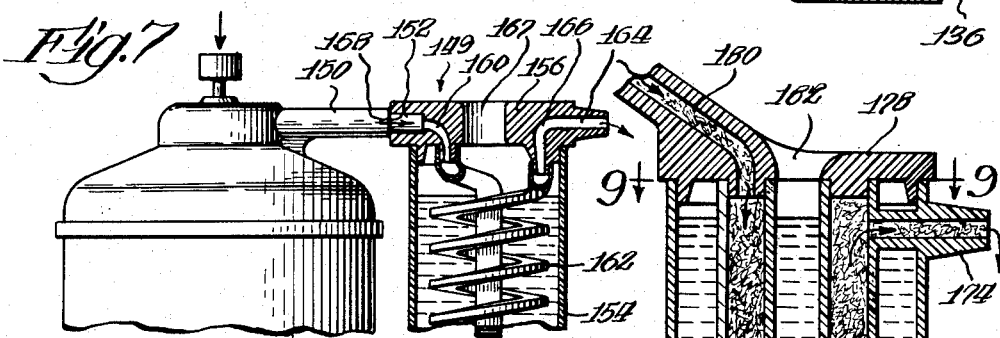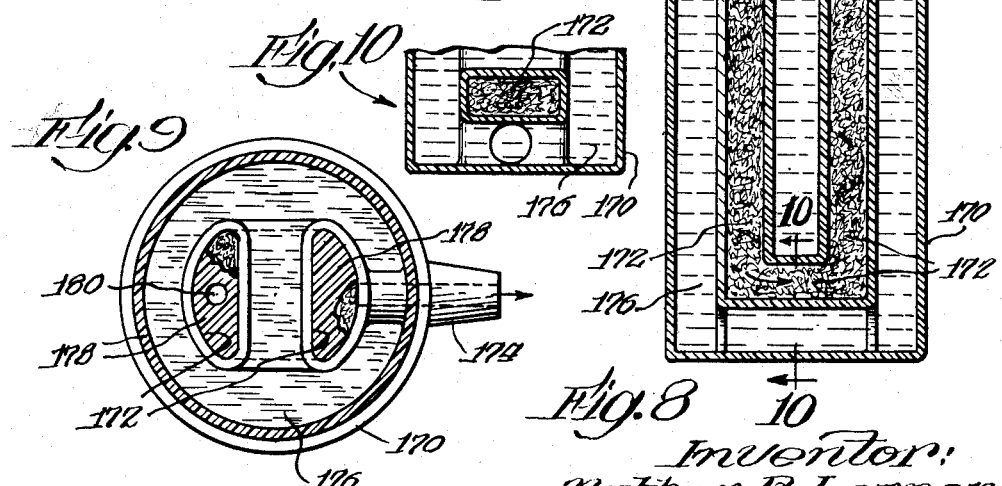

ized aerosol-type dispenser as same is 10 is generally indicated by the numeral 34 and comprises
United States Patent Office 3,175,733
Patented Mar. 30, 1965

3,175,733
MEANS FOR HEATING THE CONTENTS OF A PRESSURIZED AEROSOL-TYPE DISPENSER AS SAME IS BEING DISCHARGED FOR USE
Nathan B. Lerner, 320 N. Canal St., Chicago, Ill.
Filed June 27, 1962, Ser. No. 205,734
9 Claims. (Cl. 222—146)

This invention relates to means for heating the contents of a pressurized aerosol-type dispenser as same is being discharged for use.

One of the objects of this invention is to provide heating means for an aerosol-type dispenser whereby the contents thereof is heated prior to being discharged.

Another object of this invention is to provide heating means at the discharge end of the aerosol dispenser whereby the contents to be discharged is caused to be confined and to travel in a circuitous or tortuous path and heated, thereby exposing the contents to the heating means over a large area of travel to insure the proper heating of the contents before it is discharged.

Another object of this invention is to provide means at the discharge end of the aerosol-type dispenser wherein the contents at the discharge end is confined in a circuitous or tortuous shaped duct, which is heated to heat the contents within the duct so that same is discharged in a heated condition.

This invention has particular application to materials such as shaving lather or any other products which should be discharged in a heated condition.

Other objects and advantages will become apparent as this description progresses.

In the drawings:

FIGURE 1 is a view with a portion broken away, showing one form of the unit attached to an aerosol-type dispenser.

FIGURE 2 is a cross-sectional view of the structure shown in FIGURE 1.

FIGURE 3 is a plan view of a modified construction with a portion shown in section.

FIGURE 4 is a cross-sectional view taken on lines 4—4 of FIGURE 3.

FIGURE 5 is a cross-sectional view of another modification.

FIGURE 6 is a cross-sectional view of another modification.

FIGURE 7 is a view of another modification.

FIGURE 8 is a cross-sectional view of a still further modification.

FIGURE 9 is a cross-sectional view taken on lines 9—9 of FIGURE 8, and

FIGURE 10 is a cross-sectional view taken on lines 10—10 of FIGURE 8.

Referring to the construction shown in FIGURES 1 and 2, the aerosol container is indicated by the numeral 12. The container has a permanently affixed cover 14, having a centrally raised portion 16 which is depressed to form an annular well 18, the top wall 19 of which has a downwardly extending short tubular portion 20. The tubular portion 20 provides a central opening 22, having a valve seat 23 at the lower end thereof.

Affixed to the underside of the top wall 19 is a valve housing 24, the bottom of which is provided with an upwardly extending tubular portion 26 providing a central opening 27. A valve member 28 having a valve head 30 is positioned to engage the valve seat 23 of the depending tubular portion 20. A coil spring 32 is interposed between the valve head 30 and the valve housing and said spring surrounds the upwardly extending tubular portion 26 to normally maintain the valve in closed position, as shown in FIGURE 2.

The heating means forming this invention is the unit attachable to the top of the aerosol dispenser. The unit is generally indicated by the numeral 34 and comprises a cylindrically-shaped housing 36 having a centrally positioned depending annular portion 37 which seats within the annular well 18. The depending portion 37 has a bottom wall 38 which is a continuation of the bottom wall 39 of the housing.

Extending upwardly from the bottom wall 38 into the interior of the housing is a tubular column 40. The bottom 41 of the column 40 forms the top of a passageway 42 which communicates with a laterally extending outlet 44. The bottom wall 41 of the column is provided with a vertical bore 46 to slidably receive the stem 48 of the plunger or valve actuating member 50 supported therewithin.

The plunger 50 has a head 52 at the upper end thereof and the plunger extends through the bore 46 into the passageway 42 in the lower portion of the housing and into the opening 22 of the housing 36 to engage ing and into the opening 22 of the housing 36 to engage the valve head 30. The upper end of the plunger 50 extends through an opening 53 in the cap or cover 54 of the housing. The cap or cover 54 is threadedly secured as at 55 to the housing 36. The cap has a central seat 56 engaging the top of column 40. A manually engageable button 57 is secured to the top of the plunger 50. The cover 54 is provided with an enlarged opening 58 for the purpose of filling the container with hot water or the like.

Connected as at 59 to the laterally extending outlet 44 inside the housing 36 is a coil or circuitous or tortuous conduit or passage 60 which extends within the housing, almost the full height of the housing. The upper end of the conduit or coil 60 is connected as at 61 to the outlet or discharge end 62 in the housing 36.

Manually depressing the plunger 50 will unseat the valve head 30 and the contents from the aerosol container 12 will pass through opening 22, passageway 42, outlet 44, and into the coil or circuitous or tortuous conduit 60 and through the discharge outlet 62.

The coil 60 is oval-shaped in cross-section to provide a large exposed surface area. With each actuation of the plunger 50 the pressure within the container 12 will force the contents therefrom into the coil or conduit 60 and any of the contents already in the coil will be forced outwardly, thus, at all times after the container has ben placed into use and the plunger has ben initially depressed, it will be found that the coil or circuitous or tortuous conduit 60 is filled with the material from the container 12.

For the purpose of rapidly heating the contents in the circuitous tubing 60, hot water is placed in the housing 36 through the top cover opening 58. The hot water within the housing will heat the tubing 60 and the contents within the tubing; this takes place very rapidly. In use, the tubing 60 will at all times be filled with some of the contents from the aerosol container. As the plunger is depressed to open the valve 30, the contents confined within the tubing 60 will be discharged first through the outlet 62, and since this has been heated by the water, the contents initially discharged will be in a heated condition. Between each operation of the plunger the contents in the tubing 60 will have been heated by the hot water prior to its being discharged. The heating unit just described may be detachably secured to the container 12, or it may be permanently secured thereto.

Reference will now be had to FIGURES 3 and 4.

The outward appearance and shape of the heating unit shown in FIGURES 3 and 4 is identical to that shown in FIGURES 1 and 2. The unit, generally indicated by the numeral 66, consists of a housing 68 having a core forming a circuitous or tortuous passage generally indicated at 70 for passage of the container contents.

The circuitous or tortuous passage 70 is formed by a pair of spaced vertical walls 72 and 74 which are spirally shaped and extend continuously from the center tubular column 40' to the housing wall. The vertical wall 72 connects as at 76 to the housing wall 68 so that the passage 70 communicates with the laterally extending discharge outlet 78. The vertical wall 74 terminates adjacent the housing wall 68 as at 80. An opening 71 is provided in the lower wall of the column 40' connecting the passage 70 with the passageway 42'.

In addition to the circuitous or tortuous passage 70 for the passage of the container contents, another circuitous or tortuous shaped duct 82 is formed adjacent the passage 70. Duct 82 has no discharge outlet from the housing as its purpose is to hold the hot water poured into the housing 68 and to heat the contents in the passage 70.

A plate 84 is secured to extend across the top of the vertical walls 72 and 74 so that the vertical walls which form the passage 70 are closed at the top thereof. The plate 84 is provided with a plurality of spaced openings 86 extending over the top of the vertical walls forming the duct 82 so that the water introduced into the housing will flow through the openings 86 and fill the duct 82. A cover 54', similar to the cover 54, described in FIGURES 1 and 2, is secured to the top of the housing 68 and same is provided with an opening 58' through which the housing 68 is filled with hot water.

The remaining parts and the manner in which they are secured to the aerosol dispenser are the same as that described in FIGURES 1 and 2, and the same parts will not be redescribed but will be given the same number primed. The operation is as follows.

Upon manual depression of the plunger 50', the valve head 30' will be unseated and the container contents will enter the passageway 42', opening 71 and tortuous passage 70, and discharged through the outlet 78.

As in the previous embodiment, after the valve has been actuated for the first time the container contents will flow into the circuitous or tortuous passage 70 and will remain therein so that any hot water introduced into the housing through opening 58' will fill the circuitous or tortuous duct 82 and heat the contents in the passage 70, so that when it is desired to expel or discharge the contents from the housing unit, as by depressing the plunger valve, the contents within the housing unit will be expelled in a heated condition.

This construction provides a large surface area for the contents and the means whereby the heating means is in contact with that surface so that the material therein is heated rapidly. As is true with respect to the structure shown in FIGURES 1 and 2, the water from the housing 36 or 68 may be emptied by inverting the housing and the water will flow out through the respective openings 58 or 58'.

In the embodiment shown in FIGURE 5, the unit is attached to the nozzle of the container. In this construction the aerosol container 90 has a discharge nozzle 92 extending upwardly of the container. The contents from the container is discharged through the nozzle 92 by pressing laterally against the nozzle to tilt it slightly. This will operate the valve structure within the nozzle to permit the contents to be discharged. A nozzle and valve structure of this type is well known in the art and therefore is not shown in detail.

The unit comprising this invention, generally indicated by the numeral 93, includes a housing indicated at 94, the bottom of which has an enlarged central opening 95 internally threaded to engage the external threads on the base 97 of the nozzle 92 so that the unit is secured to the nozzle. Mounted on top of the housing is a cover 98. The cover has an enlarged central opening 99 and another opening 100.

Secured to the nozzle is an outlet member 101 having an internally threaded opening 102 at the bottom thereof which communicates with an inverted L-shaped passageway 104. The central opening 99 accommodates the outlet member 101. A conduit, generally indicated at 106, of oval shape in cross-section is connected to said member 101. From its connection to the passageway 104, the conduit 106 continues downwardly and then is spirally wound around the downwardly extending conduit portion as well as the nozzle 92 of the container. The member 101 also has a discharge passage 108 which is connected to the opposite end of the conduit 106. The discharge passageway 108 continues in the lateral extension 110 to form the discharge outlet of the unit. The member 101 has a raised portion 112 which is manually engaged and pushed laterally to tilt the nozzle 102 and thereby discharge the container contents.

The coil 106 and member 101 attached to the nozzle 92 move with the nozzle as same is tilted relative to the housing 94, which does not tilt to any extent. Applying pressure against the finger engaging portion 112 will slightly tilt the nozzle 92 and member 101 and coil 106 with it to operate the valve inside the nozzle. The contents of the container 90 will pass from the nozzle 92 into passage 104, through the coil or circuitous conduit 106, and through discharge or outlet passage 108. Hot water is supplied to the housing 94 through the opening 100 and the hot water will heat the coil 106 and the contents within the coil.

In this embodiment the contents is contained in the conduit 106, as previously described, so that any hot water introduced into the housing will heat the contents within the conduit 106 before it is discharged through the discharge outlet 110.

The embodiment shown in FIGURE 6 will now be described.

This unit is attachable to the top of an aerosol container similar to that described in connection with the embodiments shown in FIGURES 1 to 4 inclusive. The top of the aerosol container is like that shown and described in connection with FIGURES 1 and 2. It has a central annular well 18a, a top wall 19a, a tubular portion 20a providing a central opening 22a, and a valve seat 23a. The valve housing 24a is secured to the wall 19a. The valve member 28a has a valve head 30a urged to normally engage the valve seat 23a by the spring 32a.

The unit generally indicated at 118 includes a housing 120, the lower end of which is shaped to fit within the central annular well 18a of the top of the container. Extending from the top of the housing is a boss 122 having a central bore 124 to slidingly receive a plunger 126, the lower end of which is in engagement with the valve head 30a. A flange 128a on the plunger limits the upward movement of said plunger. The plunger has a manually engageable button 129 at the top thereof. In normal position the parts are as shown in FIGURE 6, with the valve of the container in closed position.

The housing 120 has a lateral extension 130 providing a duct 132 in communication with the housing. A plate member 134 extends laterally of the lateral extension. A cylindrical shaped housing 136 is secured to the plate 134. A coiled conduit 138 is supported within the housing 136 and the opposite ends of said conduit are connected as shown. One end of the conduit 138 is connected as at 140 to the duct 132, and the other end is connected as at 142 to a discharge outlet 144 in the forward portion of the plate 134. The plate 134 is provided with an opening 146 through which the housing 136 is filled with hot water. A metal strap 148 extends from the housing 136 to the aerosol container for the purpose of securing and positioning the housing 136.

Depressing of the plunger 126 will unseat the valve head 30a to cause the contents to enter the housing 120 and through the duct 132 into the conduit or coil 138, and from the coil to be expelled through the nozzle 144. The hot water within the housing 136 will heat the coil and will heat the material as previously described.

FIGURE 7 shows a modified construction in which the unit generally indicated at 149 is detachably secured to the nozzle of an aerated container. The nozzle 150 shown has a reduced end 152 to which the heating unit 149 is attached. The heating means in this construction includes a cylindrical housing 154 and a cover plate 156 secured at the upper end of the housing. The plate 156 has a horizontally extending opening 158 whereby the unit may be attached to the nozzle. Communicating with said opening is a passageway 160 in the plate 156. The coil 162 is of a construction similar to that described in FIGURE 6, and one end of the coil member is attached to the plate communicating with the passageway 160. The opposite side of the plate 156 has a discharge nozzle 164 and a communicating duct 166, and the opposite end of the coil 162 is secured thereto. The plate has a central opening 167 to permit the housing 154 to be filled. The contents discharged from the aerated container through the nozzle 150 will pass through the coil 162 and out through the discharge nozzle 164. The hot water within the housing 154 will heat the coil or conduit 162 as well as the contents therewithin.

The modification shown in FIGURES 8, 9 and 10 is of such construction that it may be used as an attachment like that shown in FIGURE 7, wherein it is attached to the end of the laterally extending nozzle 150 of the dispenser, or it may be used in the environment in which the unit is part of a housing like 120 shown in FIGURE 6.

The construction shown includes a cylindrical housing 170, within which housing there is provided a circuitous or tortuous duct or passageway 172 extending substantially the height of the cylindrical housing. The duct 172 is of generally U-shaped configuration and communicates with a laterally extending discharge outlet 174. The duct 172 has a cross-sectional shape, best shown in FIGURE 9. The housing surrounding the duct and indicated by the numeral 176 is adapted to be filled with hot water for the purpose of heating the circuitous duct 172. The plate member 178 is secured to the top of the housing 170 and said plate has an inlet duct 180 which communicates with the central U-shaped duct 172 of the housing.

The inlet duct 180 of the unit may be provided with a fitting, not shown, to be attached to the nozzle 150 shown in FIGURE 7, or it may be part of a unit like that shown in FIGURE 6 in which the duct 180 is part of the lateral extension 130. In any event, the contents from the aerated container enters the duct 180 and passes through the U-shaped passageway 172 in the housing 170 and is discharged through the lateral nozzle 174. The housing 170 is filled with hot water through the opening 182 at the top of the plate 178. The hot water surrounding the duct 172 rapidly heats the contents within the duct.

In the various embodiments shown, the pressurized contents within the container is discharged into and contained within the circuitous or tortuous passageway after the initial operation, thus, there is at all times a supply of the material or contents in the circuitous passageway which is immersed and surrounded by hot water in a stationary condition to expose a large area and a relatively large volume of material which is rapidly heated within the passageway or duct so that it is discharged in a heated condition.

In prior constructions the heating was through a relatively short path of travel of the contents and it was impossible to heat the aerated material before it was dispensed. With the present invention, and by virtue of the circuitous or tortuous passageway in which the aerated material is confined before it is discharged, the material is heated in a relatively short time. This invention provides a construction which accomplishes a result unobtainable by prior constructions.

It will be understood that various changes and modifications may be made from the foregoing without departing from the spirit and scope of the appended claims.

What is claimed is:

1. A device for dispensing a heated propellant-containing material comprising, a container for a supply of propellant-containing material and having a valved outlet through which said material is discharged, said device including a circuitous passageway and means around said circuitous passageway, said circuitous passageway having an inlet and an outlet with the inlet connected to the valved outlet of said container to receive the propellant material from said container, said propellant material passing through said circuitous passageway and out through said last mentioned outlet, depressible means on said device for opening said valved container outlet to permit the discharge of said material from said container to said circuitous passageway, said means around said circuitous passageway adapted to receive heated liquid so that said heated liquid heats the material within said circuitous passageway before it is discharged, said circuitous passageway and said means around said circuitous passageway secured to said container in an exposed position.

2. A device as defined in claim 1 in which the circuitous passageway is a coil through which the material passes.

3. A device as defined in claim 1 in which the means around the circuitous passageway traps the heated liquid.

4. A device as defined in claim 1 in which the means around the circuitous passageway is a housing and said housing has an outlet which communicates with the outlet of said circuitous passageway.

5. A device as defined in claim 1 in which the circuitous passageway is a circuitous duct through which the material passes.

6. A device as defined in claim 5 in which the circuitous duct is within the confines of the means around said circuitous passageway which is a housing, and is spaced from the walls of said housing.

7. A heating device secured to the valved outlet member of an aerosol-type dispenser, said device including a housing and a circuitous passageway within said housing, said circuitous passageway having an outlet and an inlet for connecting said circuitous passageway to the valved outlet member of the dispenser, depressible means on said device engaging said valved outlet member whereby when said depressible means is actuated the pressurized contents from the dispenser passes through said circuitous passageway and said outlet and is discharged, said housing extending around said circuitous passageway and having an opening whereby a heated liquid is introduced into said housing for heating the contents within said circuitous passageway prior to discharge of same, said housing and circuitous passageway being secured to said dispenser in an exposed position.

8. A device as defined in claim 7 in which the circuitous passageway is a coil.

9. A device as defined in claim 7 in which the circuitous passageway is a circuitous duct which is spaced from the wall of the housing.

References Cited by the Examiner

UNITED STATES PATENTS

| | | | |
|---|---|---|---|
| 491,320 | 2/93 | Mitchell | 219—302 |
| 890,053 | 6/08 | Henriksen | 219—302 |
| 1,110,919 | 9/14 | Gamble | 214—326 |
| 2,462,861 | 2/49 | Walters | 239—132 |
| 2,873,351 | 2/59 | Lannert. | |
| 3,069,528 | 12/62 | Gardner | 219—39.3 |
| 3,095,122 | 6/63 | Lewiecki | 222—146 |
| 3,098,925 | 7/63 | Fouts et al. | |

FOREIGN PATENTS 8,635 4/03 Great Britain.

RAPHAEL M. LUPO, *Primary Examiner.*

LOUIS J. DEMBO, *Examiner.*